United States Patent
Hashimoto et al.

(10) Patent No.: US 10,430,535 B2
(45) Date of Patent: Oct. 1, 2019

(54) VERIFICATION SUPPORT PROGRAM MEDIUM, VERIFICATION SUPPORT METHOD, AND INFORMATION PROCESSING DEVICE FOR VERIFICATION OF A CIRCUIT

(71) Applicant: FUJITSU LIMITED, Kawasaki-shi, Kanagawa (JP)

(72) Inventors: Michitaka Hashimoto, Kawasaki (JP); Ryo Mizutani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 140 days.

(21) Appl. No.: 15/708,693

(22) Filed: Sep. 19, 2017

(65) Prior Publication Data
US 2018/0121584 A1 May 3, 2018

(30) Foreign Application Priority Data
Oct. 31, 2016 (JP) .................. 2016-212655

(51) Int. Cl.
*G06F 17/50* (2006.01)
(52) U.S. Cl.
CPC ...... *G06F 17/5031* (2013.01); *G06F 17/5027* (2013.01); *G06F 17/5054* (2013.01)
(58) Field of Classification Search
CPC ............ G06F 17/5031; G06F 17/5027; G06F 17/5054
See application file for complete search history.

(56) References Cited

U.S. PATENT DOCUMENTS

| | | | | |
|---|---|---|---|---|
| 5,870,309 A * | 2/1999 | Lawman | ............. | G06F 17/5031 716/102 |
| 6,427,226 B1 * | 7/2002 | Mallick | ............... | G06F 17/5031 716/113 |
| 6,711,730 B2 * | 3/2004 | Frank | .................. | G06F 17/5068 716/113 |
| 7,013,443 B2 * | 3/2006 | Iwai | ..................... | G06F 17/5022 716/114 |
| 7,082,584 B2 * | 7/2006 | Lahner | ................ | G06F 17/5022 716/102 |

(Continued)

FOREIGN PATENT DOCUMENTS

| | | |
|---|---|---|
| JP | 2012-58911 | 3/2012 |
| JP | 2012-168718 | 9/2012 |

*Primary Examiner* — Naum Levin
(74) *Attorney, Agent, or Firm* — Staas & Halsey LLP

(57) ABSTRACT

An information processing apparatus includes a memory and a processor: where the memory stores first correspondence information in which, regarding each of regions delimited based on a level of possibility that a path included in a circuit does not meet timing constraints, region information representing the region and a range of a value of an item relating to delay of the path are associated with each other and second correspondence information in which, regarding a certain region, region information that represents the certain region and countermeasure information that represents a countermeasure against delay of the path whose value of the item corresponds to the certain region are associated with each other; and the processor outputs the countermeasure information by referring to the first and the second correspondence information, regarding a value of the item relating to delay of a path included in a target circuit of verification.

9 Claims, 15 Drawing Sheets

(56) References Cited

U.S. PATENT DOCUMENTS

| | | | | |
|---|---|---|---|---|
| 7,162,706 B2 * | 1/2007 | Kuang | G06F 17/5022 | 716/108 |
| 7,222,318 B2 * | 5/2007 | Srinivasan | G06F 17/505 | 716/114 |
| 7,243,315 B2 * | 7/2007 | Tan | G06F 17/5068 | 716/113 |
| 7,380,228 B2 * | 5/2008 | Fry | G06F 17/5031 | 703/19 |
| 7,437,697 B2 * | 10/2008 | Venkateswaran | G06F 17/5031 | 716/113 |
| 8,639,975 B2 * | 1/2014 | Whatmough | H03M 13/09 | 714/15 |
| 8,788,995 B1 * | 7/2014 | Kumar | G06F 17/5031 | 716/110 |
| 8,806,413 B2 * | 8/2014 | Shaikh | G06F 17/5031 | 716/113 |
| 8,863,052 B1 * | 10/2014 | Dhuria | G06F 17/5036 | 716/108 |
| 8,875,082 B1 * | 10/2014 | Sircar | G06F 17/5031 | 716/110 |
| 8,959,467 B2 * | 2/2015 | Mehetre | G06F 17/5031 | 716/106 |
| 9,189,591 B2 * | 11/2015 | Segal | G06F 17/5081 | |
| 9,390,221 B2 * | 7/2016 | Oh | G06F 17/5081 | |
| 9,740,807 B2 * | 8/2017 | Mohan | G06F 17/5031 | |
| 2007/0079266 A1 * | 4/2007 | Devineni | G06F 17/5081 | 716/112 |
| 2007/0143722 A1 * | 6/2007 | Venkateswaran | G06F 17/5031 | 716/108 |
| 2014/0019795 A1 * | 1/2014 | Sonoda | G06F 11/0751 | 714/2 |
| 2015/0121328 A1 * | 4/2015 | Segal | G06F 17/5081 | 716/113 |
| 2017/0310572 A1 * | 10/2017 | Yi | H04L 43/08 | |

* cited by examiner

FIG. 6
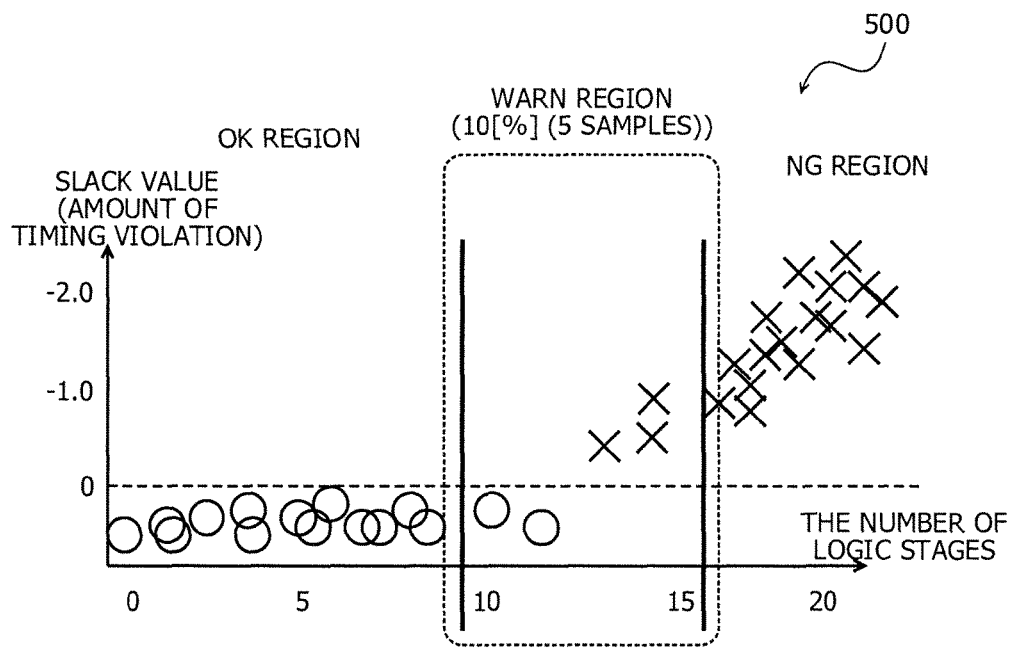
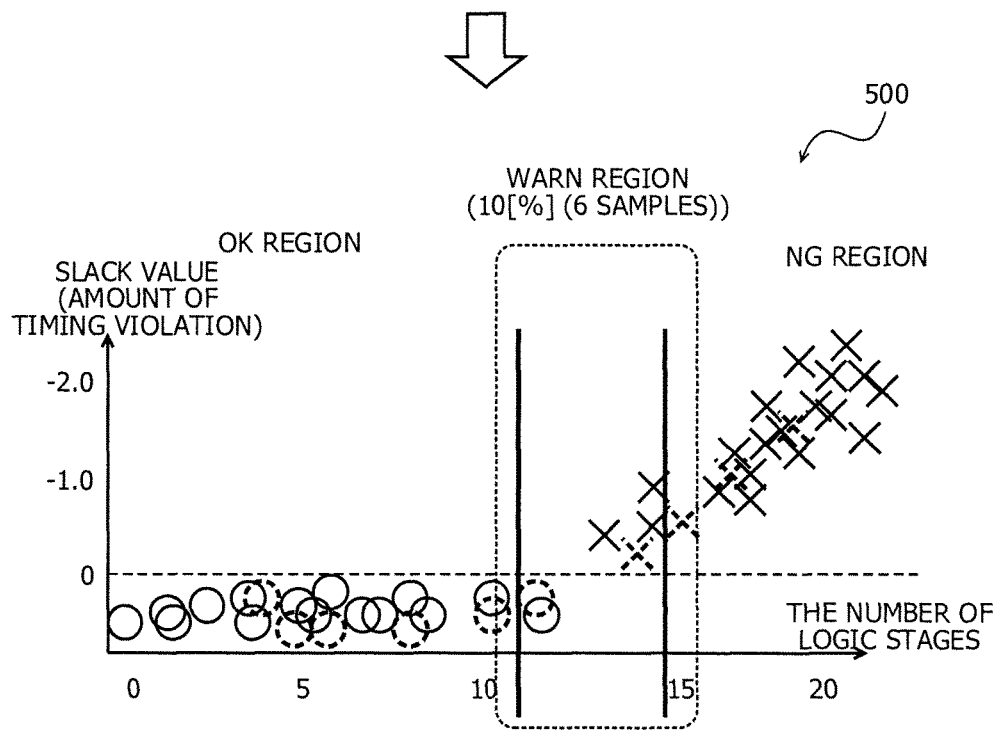

FIG. 7

| MANUFACTURER | DEVICE | FREQUENCY [MHz] | MAIN CAUSES OF TIMING ERROR 303 | | | | | | | | | | | |
|---|---|---|---|---|---|---|---|---|---|---|---|---|---|---|
| | | | THE NUMBER OF LOGIC STAGES | | INTER-DISPOSITION DISTANCE | | THE NUMBER OF FANOUTS | | CLOCK SKEW | | INTERCONNECT LENGTH | |
| | | | Value | DETERMINATION | Value | DETERMINATION | Value | DETERMINATION | Value | DETERMINATION | Value | DETERMINATION |
| COMPANY A | AAA | ~100 | ~20 | OK | ~30 | OK | ~300 | OK | ~20 | OK | ~5 | OK |
| | | | 21~30 | WARN | 31~40 | WARN | 301~500 | WARN | 21~30 | WARN | 6~10 | WARN |
| | | | 31~ | NG | 41~ | NG | 501~ | NG | 31~ | NG | 11~ | NG |
| | | 101~200 | ~15 | OK | ~20 | OK | ~200 | OK | ~15 | OK | ~3 | OK |
| | | | 16~20 | WARN | 21~30 | WARN | 201~400 | WARN | 16~20 | WARN | 4~8 | WARN |
| | | | 21~ | NG | 31~ | NG | 401~ | NG | 21~ | NG | 9~ | NG |

FIG. 8

| MAIN CAUSES OF TIMING ERROR | DETERMINATION VALUE | CONTENTS OF COUNTERMEASURE |
|---|---|---|
| THE NUMBER OF LOGIC STAGES | WARN | THE NUMBER OF STAGES IS LARGE. BECAUSE POSSIBLY TIMING CLOSURE BECOMES DIFFICULT DEPENDING ON CASE, PLEASE CARRY OUT CYCLE PARTITIONING. |
| | NG | THE NUMBER OF STAGES IS LARGE. BECAUSE TIMING CLOSURE IS NOT ACHIEVED, PLEASE CARRY OUT CYCLE PARTITIONING. |
| INTER-DISPOSITION DISTANCE | WARN | INTER-DISPOSITION DISTANCE IS LONG. BECAUSE POSSIBLY TIMING CLOSURE BECOMES DIFFICULT DEPENDING ON CASE, PLEASE REDUCE INTER-DISPOSITION DISTANCE AND FIX DISPOSITION IN LAYOUT. |
| | NG | INTER-DISPOSITION DISTANCE IS LONG. BECAUSE TIMING CLOSURE IS NOT ACHIEVED, PLEASE REDUCE INTER-DISPOSITION DISTANCE AND FIX DISPOSITION IN LAYOUT. |
| ... | ... | ... |

```
==========================
Path Summary
    Source
 (TRANSMITTING)      : REGISTER A
    Sink
  (RECEIVING)        : REGISTER B
   Data Arrival Time  : 10 ns
   Data Required Time : 8 ns
   Slack              : -2 (TIMING ERROR)
==========================
Data Arrival Path
==========================
Total Arrival Path
==========================
Total  Incr   Type    Fanout   Element
==========================
1      1      CELL    1        A
2      1      CELL    5        B
9     (7)     IC      1        aa
10     1      CELL    1        REGISTER B
```

302-x

VERIFICATION SUPPORT PROGRAM MEDIUM, VERIFICATION SUPPORT METHOD, AND INFORMATION PROCESSING DEVICE FOR VERIFICATION OF A CIRCUIT

CROSS-REFERENCE TO RELATED APPLICATION

This application is based upon and claims the benefit of priority of the prior Japanese Patent Application No. 2016-212655, filed on Oct. 31, 2016, the entire contents of which are incorporated herein by reference.

FIELD

The embodiment discussed herein is related to a verification support program medium, a verification support method, and an information processing device.

BACKGROUND

After configuration setting of a circuit in a field programmable gate array (FPGA), design of a semiconductor integrated circuit, or the like is carried out, timing analysis for checking whether the circuit correctly operates at a clock frequency requested by the designer is carried out. The FPGA is a form of integrated circuits inside which a desired circuit configuration may be set by a purchaser or designer after manufacturing, for example.

As a method for setting a circuit configuration in an FPGA, there is a technique that a netlist in which functions of the target circuit of the design are described is logically synthesized by using a hardware description language and layout is carried out for the FPGA based on the gate-level netlist obtained by the logic synthesis.

Furthermore, in design of a semiconductor integrated circuit, register transfer level (RTL) design, layout design, and so forth are carried out. In the RTL design, user specifications are converted to a description of the register transfer level. In the RTL design, how the respective parts of the semiconductor integrated circuit behave every clock cycle is described in a netlist or the like by a hardware description language or the like. In the layout design, layout is carried out based on a gate-level netlist obtained by logically synthesizing the RTL netlist.

As a related art, there is a technique in which, for example, operation by a designer from the start of design work to the end is recorded and the level of proficiency of the designer in the design is determined based on the degree of change in the number of errors detected by a design rule check with respect to the elapsed time of the design (for example, refer to Japanese Laid-open Patent Publication No. 2012-58911).

Furthermore, as a related art, for example, there is a technique in which a timing constraints file implemented in a downstream process after layout is extracted based on the result of clock domain crossing (CDC) verification carried out in an upstream process in development of a semiconductor integrated circuit (for example, refer to Japanese Laid-open Patent Publication No. 2012-168718).

However, for example, it is difficult to analyze timing errors obtained by timing analysis and identify the causes of the timing errors. For example, identifying the causes of timing errors is carried out based on the experience of the verifier and therefore is difficult depending on the level of proficiency of the verifier. Furthermore, for example, if the number of timing errors is large, it is difficult to analyze all timing errors at a time. Thus, the timing errors are divided into plural groups and many times of analysis are carried out. Therefore, the analysis takes a long time.

In one aspect, the embodiment discussed herein aims at providing a verification support program, a verification support method, and an information processing device that may intend to improve the efficiency of analysis of timing errors.

SUMMARY

According to an aspect of the embodiment, an information processing apparatus includes a memory and a processor: where the memory stores first correspondence information in which, regarding each of regions delimited based on a level of possibility that a path included in a circuit does not meet timing constraints, region information representing the region and a range of a value of an item relating to delay of the path are associated with each other and second correspondence information in which, regarding a certain region, region information that represents the certain region and countermeasure information that represents a countermeasure against delay of the path whose value of the item corresponds to the certain region are associated with each other; and the processor outputs the countermeasure information by referring to the first and the second correspondence information, regarding a value of the item relating to delay of a path included in a target circuit of verification.

According to one mode, improvement in the efficiency of analysis of timing errors may be intended.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is an explanatory diagram illustrating a variation example of a WARN region;

FIG. 7 is an explanatory diagram illustrating a storing example of a machine learning database (DB);

FIG. 8 is an explanatory diagram illustrating a storing example of a countermeasure DB;

FIG. 9 is an explanatory diagram illustrating a report example relating to a timing error;

DESCRIPTION OF EMBODIMENT

A verification support program, a verification support method, and an information processing device according to an embodiment will be described in detail below with reference to the drawings.

Figure 1:
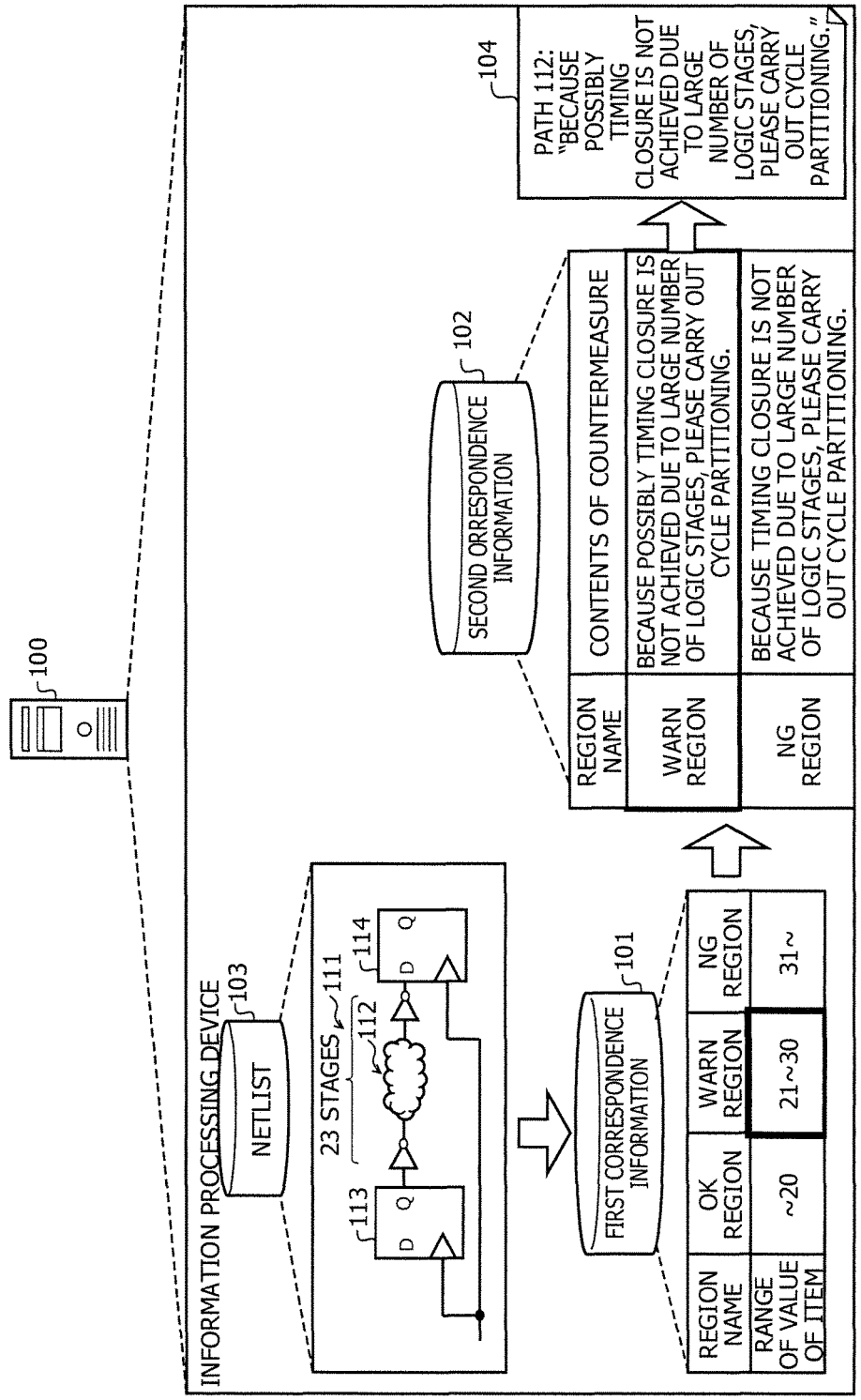
FIG. 1 is an explanatory diagram illustrating one operation example of an information processing device.

FIG. 1 is an explanatory diagram illustrating one operation example of an information processing device. An information processing device 100 is a computer that supports timing analysis of a target circuit of the analysis. The information processing device 100 is a personal computer (PC), a server, or the like, for example, and is not particularly limited.

Timing verification is carried out after configuration setting of a circuit in an FPGA or design of a semiconductor integrated circuit ends. A simple design flow of configuring a circuit in an FPGA will be described later by using FIG. 2.

For example, it is difficult to analyze timing errors obtained by timing analysis to identify the causes of the timing errors and implement countermeasures. For example, identifying the causes of timing errors and implementing countermeasures are carried out based on the experience of the verifier and therefore are difficult depending on the level of proficiency of the verifier. Furthermore, the circuit scale has increased due to increase in the degree of integration of the target circuit of design, for example. Thus, paths as the target of the timing verification have increased and paths on which timing errors occur have increased. It is difficult to simultaneously analyze plural timing errors such as several thousands or several tens of thousands of timing errors by the verifier. For example, if the number of timing errors is large, the timing errors are divided and many times of analysis and countermeasures are carried out. Thus, the analysis takes a long time.

Thus, in the present embodiment, the information processing device 100 outputs a countermeasure for error resolution if the value of an item relating to delay of a path of the target circuit corresponds to a region in which the possibility of a timing error is comparatively high among regions delimited based on the level of possibility of a timing error. Due to this, facilitation of identification of the cause of the timing error may be intended. For example, shortening of the time it takes to identify the cause of the timing error may be intended without depending on the level of proficiency of the verifier.

A storing unit (diagrammatic representation is omitted in FIG. 1) stores first correspondence information 101 and second correspondence information 102, for example.

The first correspondence information 101 is information in which, regarding each region of plural regions delimited based on the level of possibility that a path included in a circuit does not meet timing constraints, region information that represents the region and the range of the value of an item relating to delay of the path in the region are associated with each other. The path is the route between registers, the route from an input terminal to a register, the route from a register to an output terminal, the route from the input terminal to the output terminal, or the like, for example.

In FIG. 1, the region information is information that represents the region name. The number of regions is two or more. In FIG. 1, three regions of OK region, WARN region, and NG region, are cited as an example. The level of possibility that the timing constraints are not met is the level of possibility of the occurrence of a timing error, for example. An example of separation of the regions will be described in detail by using FIG. 5 and FIG. 6. In the present embodiment, the possibility that the timing constraints are not met is high in order of NG region, WARN region, and OK region.

As the value of the item relating to delay of the path, design value, verification value, and so forth are cited, for example. Among the items relating to delay of the path are items whose value is obtained by design and items whose value is obtained by timing verification. As the items whose value is obtained by design, the number of logic stages, the inter-disposition distance, the interconnect length, the number of fan-outs, and so forth are cited. The number of logic stages is an item whose value is obtained from a netlist after logic synthesis. The inter-disposition distance, the interconnect length, the number of fan-outs, and so forth are items whose value is obtained from a report or the like obtained by layout. Suppose that layout data is also included in this report. The number of logic stages, the inter-disposition distance, the interconnect length, the number of fan-outs, and so forth will be described later in FIG. 3. In the example of FIG. 1, the number of logic stages is cited as an example of the item.

According to the first correspondence information 101, if the number of logic stages of a path is equal to or smaller than 20 stages, the path is classified into the OK region. If the number of logic stages of a path is equal to or larger than 21 stages and is equal to or smaller than 30 stages, the path is classified into the WARN region. If the number of logic stages of a path is equal to or larger than 31 stages, the path is classified into the NG region.

The second correspondence information 102 is information in which, regarding each of certain regions in the plural regions, region information that represents the certain region and countermeasure information that represents a countermeasure against delay of a path corresponding to the certain region regarding the value of any of the above-described items are associated with each other. In the example of FIG. 1, the certain regions are the WARN region and the NG region.

The information processing device 100 acquires the value of the item relating to delay of a path 112 included in a target circuit 111 of verification. As the value of the item relating to delay of the path 112, design value, verification value, and so forth are cited, for example. As the items relating to delay of the path 112, items whose value is obtained by design and items whose value is obtained by timing verification are cited. As the items whose value is obtained by design, the number of logic stages, the inter-disposition distance, the interconnect length, the number of fan-outs, and so forth are cited. The number of logic stages is an item whose value is obtained from a netlist 103 after logic synthesis. The inter-disposition distance, the interconnect length, the number of fan-outs, and so forth are items whose value is obtained from a report or the like obtained by layout. Suppose that layout data is also included in this report. In FIG. 1, the number of logic stages is cited as an example of the item. The netlist 103 that represents the coupling relationship between cells included in the target circuit 111 is obtained through logic synthesis for a netlist in which functions of the target circuit of design are described by using a hardware description language, for example. As the hardware description language, Verilog hardware description language (HDL), very-high-speed integrated circuit (VHSIC) HDL (VHDL), and so forth are cited, for example.

The path 112 is the route between a register 113 and a register 114. The number of logic stages on the path 112 is 23 stages.

The information processing device 100 refers to the first correspondence information 101 and determines whether or not the region corresponding to the acquired value of the item in the plural regions is the certain region. The certain region is the region represented by the region information included in the second correspondence information 102. For example, the certain regions are the WARN region and the NG region. In the example of FIG. 1, the information processing device 100 identifies the WARN region as the region corresponding to the 23 stages according to the first correspondence information 101. Then, the information processing device 100 determines that the identified WARN region is the certain region.

If determining that the identified region is the certain region, the information processing device 100 refers to the second correspondence information 102 and outputs the countermeasure information associated with the region information that represents the certain region. For example, the information processing device 100 acquires the contents of the countermeasure corresponding to the WARN region in the second correspondence information 102. Then, the information processing device 100 outputs the acquired contents of the countermeasure to a report 104, for example. The information processing device 100 may store the report 104 in the storing unit or the like. Alternatively, the information processing device 100 may display the report 104 on a display or the like.

This may intend to facilitate identification of the cause of the timing error. For example, shortening of the time it takes to identify the cause of the timing error may be intended without depending on the level of proficiency of the verifier. In the example of FIG. 1, the information processing device 100 may output information indicating that the possibility that the number of logic stages is the cause is high to the verifier.

Here, in the present embodiment, timing verification in the case in which a circuit is configured in an FPGA is cited as an example of timing verification. A design flow of configuring a circuit in an FPGA will be simply described by using FIG. 2. However, the timing verification is not limited to the timing verification in the case in which a circuit is configured in an FPGA. For example, the timing verification may be timing verification after logic synthesis for configuring a circuit in an FPGA or may be timing verification after layout design or timing verification after logic synthesis in a design flow of a semiconductor integrated circuit. The timing verification is not particularly limited.

Figure 2:
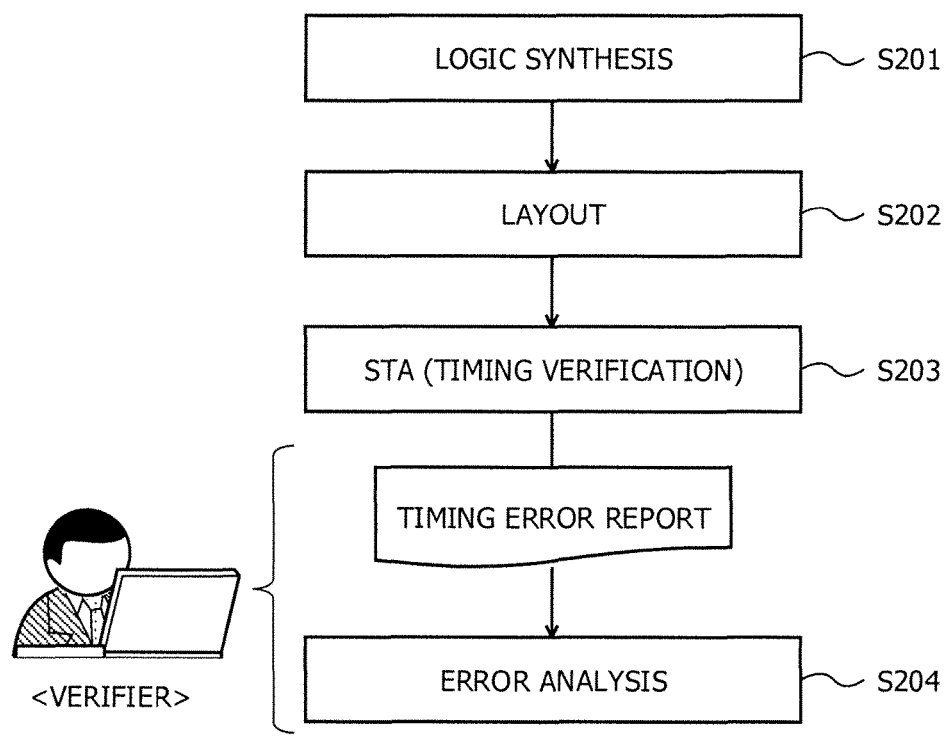
FIG. 2 is an explanatory diagram illustrating a design flow example of an FPGA.

FIG. 2 is an explanatory diagram illustrating a design flow example of an FPGA. Processing of setting of the circuit configuration in the FPGA, determination of whether timing constraints are met, and so forth are executed by an application program provided by the vendor of the FPGA. Here, the designing device is a computer that operates the application program. The designing device carries out logic synthesis for a netlist in which functions of the target circuit of the design are described by using a hardware description language, for example (step S201). As the hardware description language, Verilog HDL, VHDL, and so forth are cited, for example. Next, the designing device carries out layout for the target FPGA based on a gate-level netlist obtained by the logic synthesis (step S202). The "gate" here is a (macro) cell including a transistor included in a logic circuit. As the gate, NOR gate, OR gate, inverter gate, buffer gate, register, and so forth are cited.

Then, after configuring the circuit in the FPGA, the designing device carries out timing verification called static timing analysis (STA), for example (step S203). In the timing verification, the designing device determines whether or not the timing meets given constraints. Furthermore, the designing device executes processing of determining whether or not the area, the power consumption, and so forth meet given constraints besides the timing, and so forth. Thereby, the designing device outputs a report of the timing error obtained by the timing verification.

Then, a verifier carries out error analysis with reference to the report of the timing error, for example (step S204). The verifier identifies the cause of a timing error and implements a countermeasure, for example. Identifying the cause and the countermeasure are carried out based on the experience of the verifier, such as analysis point and procedure. The time it takes to identify the cause and implement the countermeasure depends on the level of proficiency of the verifier. Furthermore, because the circuit scale has become large and paths as the target of the verification have increased. Thus, paths on which timing errors occur have increased. Even for a verifier whose level of proficiency is high, it takes a long time to analyze all of many timing errors.

In the present embodiment, the information processing device 100 may be the same as the designing device that carries out the step S201 to the step S203 and so forth or may be a computer different from the designing device.

Figure 3:
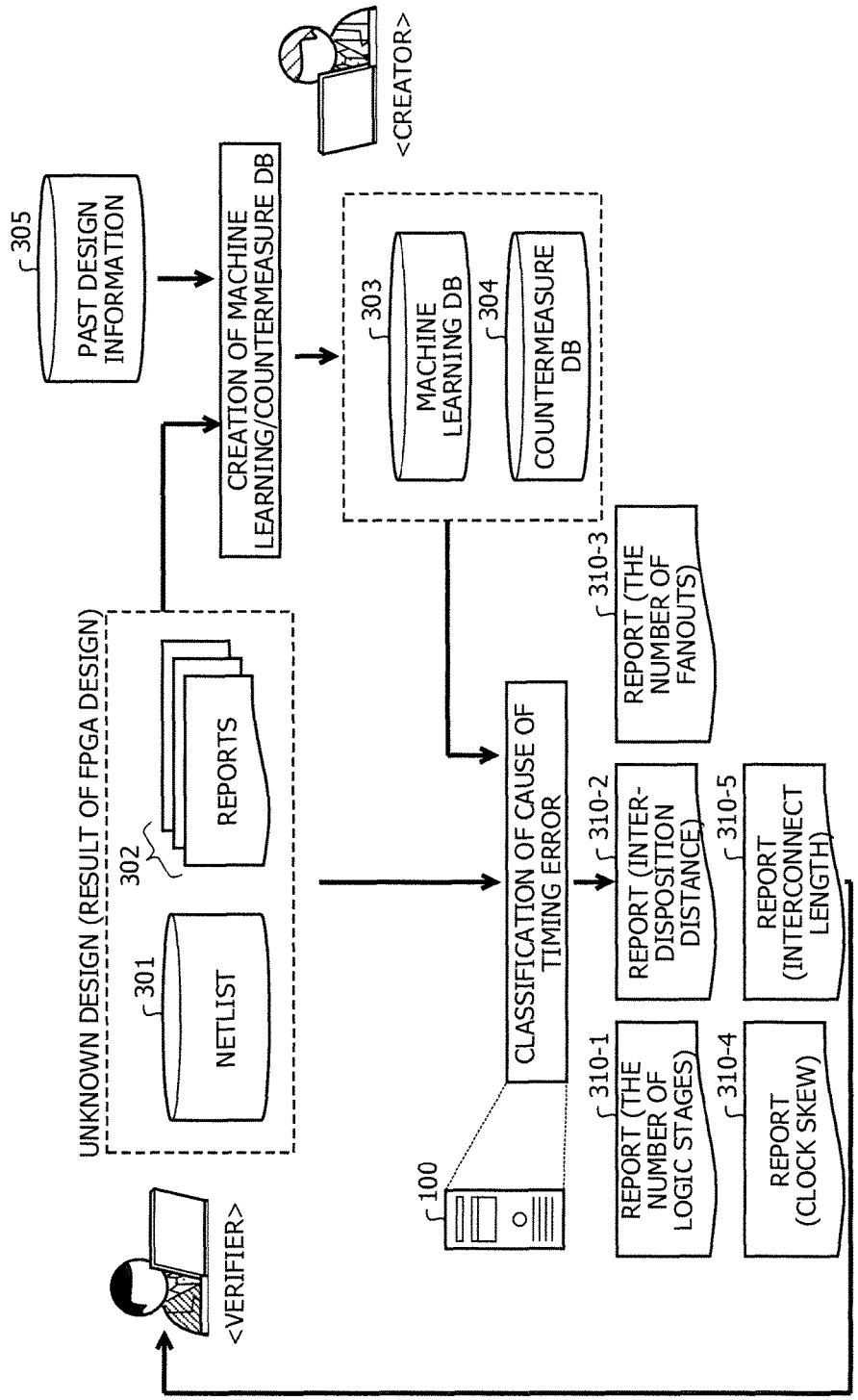
FIG. 3 is an explanatory diagram illustrating whole of an embodiment.

FIG. 3 is an explanatory diagram illustrating whole of the embodiment. A creator creates a machine learning DB 303 and a countermeasure DB 304 based on past design information 305. The creator is the provider of the information processing device 100. Furthermore, the creator may be a verifier of the target circuit. The creator inputs a newly-designed netlist 301 and reports 302 of timing errors and so forth to the information processing device 100.

Furthermore, the information processing device 100 supports analysis of the causes of the timing errors based on the input netlist 301 and reports 302 and the created machine learning DB 303 and countermeasure DB 304. The machine learning DB 303 is equivalent to the first correspondence information 101 described in FIG. 1. The countermeasure DB 304 is equivalent to the second correspondence information 102 described in FIG. 1. Furthermore, the information processing device 100 outputs reports 310-1 to 310-5 on each item basis. In the present embodiment, the information processing device 100 outputs the report 310 if the value of the item is determined to be the cause of the timing error regarding the report 310. The output of the report may be unnecessary regarding the item that has not become the cause of the error in the result of error analysis.

(Hardware Configuration Example of Information Processing Device 100)

Figure 4:
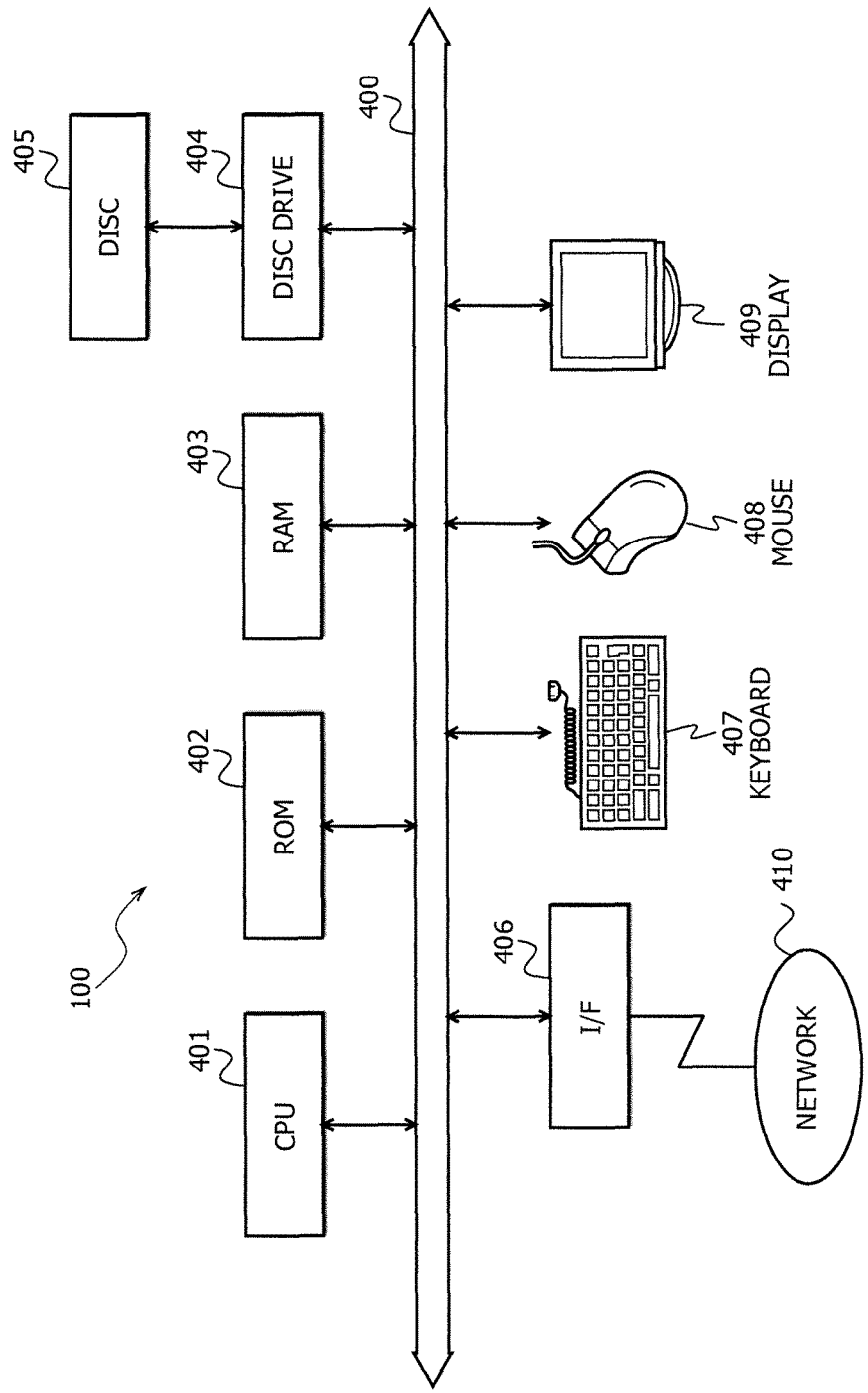
FIG. 4 is an explanatory diagram illustrating a hardware configuration example of an information processing device.

FIG. 4 is an explanatory diagram illustrating a hardware configuration example of an information processing device. The information processing device 100 includes a central processing unit (CPU) 401, a read only memory (ROM) 402, a random access memory (RAM) 403, a disc drive 404, and a disc 405. The information processing device 100 includes an interface (I/F) 406, a keyboard 407, a mouse 408, and a display 409. Furthermore, the CPU 401, the ROM 402, the RAM 403, the disc drive 404, the I/F 406, the keyboard 407, the mouse 408, and the display 409 are coupled to each other by a bus 400.

Here, the CPU 401 is responsible for control of the whole of the information processing device 100. The ROM 402 stores a program such as a boot program. The RAM 403 is used as a work area of the CPU 401. The disc drive 404 controls reading/writing of data from/to the disc 405 in accordance with control by the CPU 401. The disc 405 stores data writing under control by the disc drive 404. As the disc 405, a magnetic disc, an optical disc, and so forth are cited.

The I/F 406 is coupled to a network 410 such as a local area network (LAN), a wide area network (WAN), or the Internet through a communication line and is coupled to another device through the network 410. Furthermore, the I/F 406 is responsible for an interface between the network 410 and the inside and controls input and output of data from and to an external device. As the I/F 406, a modem, a LAN adapter, or the like may be employed, for example.

The keyboard 407 and the mouse 408 are interfaces that accept input of various kinds of data based on operation by a user such as a verifier. The display 409 is an interface that outputs data based on an instruction of the CPU 401.

Furthermore, although diagrammatic representation is omitted, the information processing device 100 may be provided with an input device that takes in images and moving images from a camera or an input device that takes in sounds from a microphone. Moreover, although diagrammatic representation is omitted, the information processing device 100 may be provided with an output device such as a printer.

Furthermore, in the present embodiment, as the hardware configuration of the information processing device 100, a personal computer is cited as an example. However, the information processing device 100 is not limited thereto and may be a server or the like. If the information processing device 100 is a server, the information processing device 100 may be coupled to a device that may be operated by the verifier, the display 409, and so forth through the network 410.

(Creation Method of Machine Learning DB)

Next, a creation method of the machine learning DB 303 possessed by the information processing device 100 will be described. The machine learning DB 303 is created based on the past design information 305 as described with FIG. 3. The creator of the machine learning DB 303 is the developer, designer, or the like of the information processing device 100. In the past design information 305, the layout result of elements, the result of timing verification, and so forth are included.

First, the creator classifies past FPGA design information into plural regions based on the level of possibility of the occurrence of a timing error regarding each item relating to delay of the path. As the item relating to delay of the path, the number of logic stages, the inter-disposition distance (linear distance), the number of fan-outs, the clock skew, the interconnect length, and so forth are cited, for example. The causes of the occurrence of a timing error is that the number of logic stages is too large, that the inter-disposition distance is too long, that the number of fan-outs is too large, that the clock skew is too large, that the interconnect length is too long, and so forth, for example.

Furthermore, the path is the route between flip-flops (FFs), the route from an input terminal to an FF, the route from an FF to an output terminal, and the route from the input terminal to the output terminal.

The number of logic stages is the number of stages of gates on the path. If the number of logic stages is too large, a timing error occurs due to increase in gate delay in some cases.

The inter-disposition distance is the distance between an FF or input terminal as the starting point of the path and an FF or output terminal as the ending point of the path, for example. If the inter-disposition distance is too long, a timing error occurs due to increase in interconnect delay in some cases.

The number of fan-outs is the number of gates coupled to the output of each gate on the path. If the number of fan-outs of the gates on the path is too large, signal change fails to be in time and timing violation occurs in some cases. The clock skew is a phenomenon in which a clock signal arrives at different parts in the circuit at different timings. For example, if the clock skew is large, setup time violation or hold time violation is caused in some cases.

The interconnect length is the length of the interconnect of the path, for example. If the interconnect length is too long, a timing error occurs due to increase in interconnect delay in some cases.

Next, by using FIG. 5 and FIG. 6, an example in which plural regions are delimited based on the value of an item and a slack value will be described with the number of logic stages taken as an example.

Figure 5:
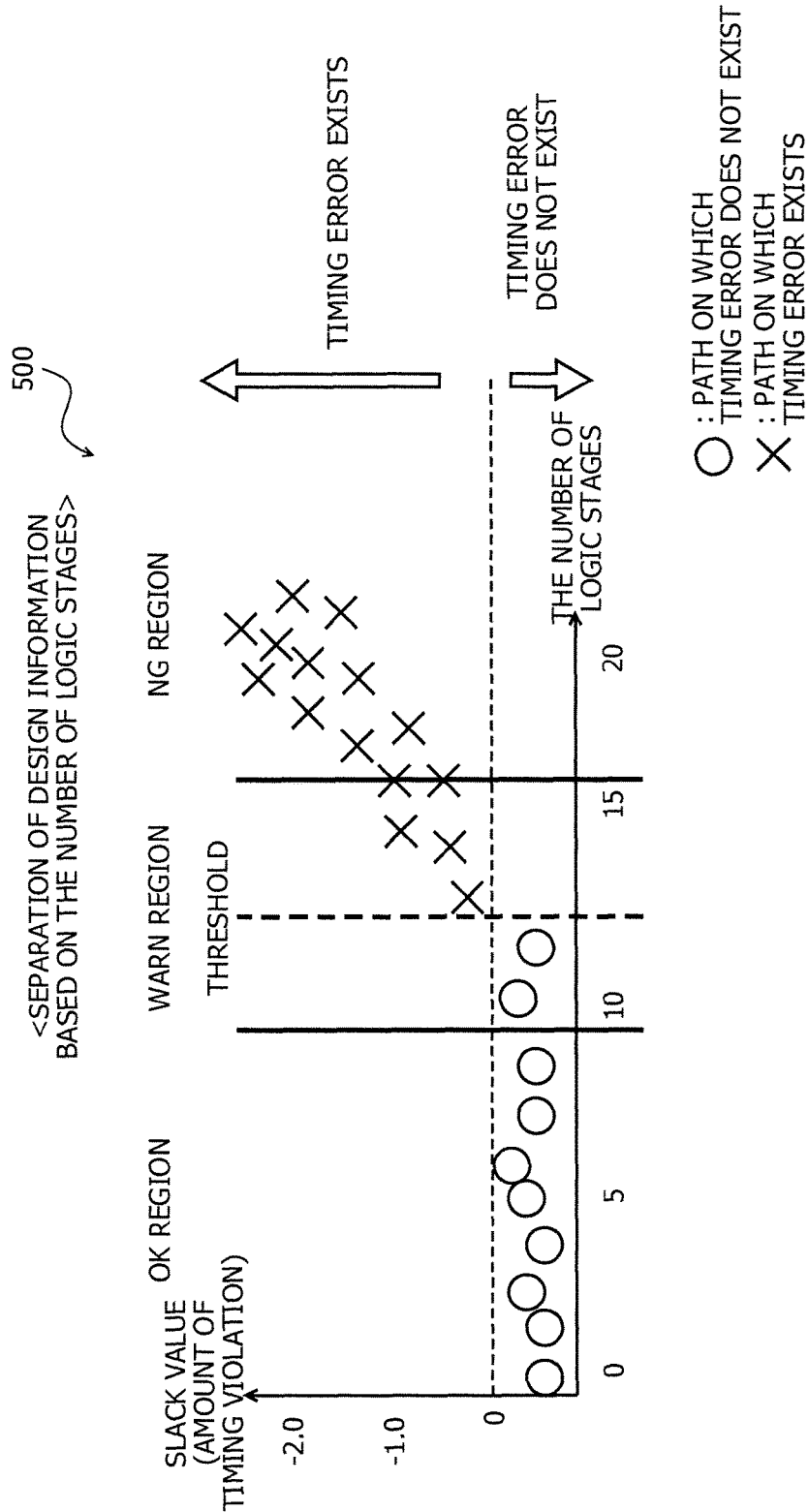
FIG. 5 is an explanatory diagram illustrating an example in which design information is classified based on the number of logic stages.

FIG. 5 is an explanatory diagram illustrating an example in which design information is classified based on the number of logic stages. A graph 500 represents a plotting result obtained by plotting paths based on the number of logic stages and the slack value included in the past design information 305. In the past design information 305, the slack value and the values of the respective items about plural paths of the circuit are included. The abscissa axis of the graph 500 is the number of logic stages. The ordinate axis of the graph 500 is the slack value.

The slack value is the result of timing verification and is an index value relating to delay of the path. The slack value is, for example, a value based on the target operating frequency and the maximum operating frequency at which the path may actually operate based on the data delay time and clock skew of the path. For example, the slack value is "(1/target operating frequency)−(1/maximum operating frequency)." In timing verification, whether timing constraints are met is determined based on whether the slack value is positive or negative. If the slack value of a path is negative, it is determined that the path does not meet the timing constraints. If the slack value of a path is positive, it is determined that the path meets the timing constraints.

In the graph 500, ○ represents a path on which a timing error does not exist. In the graph 500, x represents a path on which a timing error exists.

Next, the creator separates the plotting result into plural regions. The number of regions into which the plotting result is separated is two or three, for example. In the example of FIG. 5, the plotting result is separated into three regions of OK region, WARN region, and NG region.

The OK region is a region in which a timing error has not occurred in the past design information 305. The NG region is a region in which timing errors have occurred in the past design information 305. The WARN region is a region in which both the case in which a timing error occurs and the case in which a timing error does not occur are possible in the past design information 305.

The creator classifies the design information into the respective regions and implements the regions in the machine learning DB 303. When the number of logic stages is taken as an example, implementing the regions in the machine learning DB 303 represents registering, in the machine learning DB 303, the range of the number of logic stages in the OK region, the range of the number of logic stages in the NG region, and the range of the number of logic stages in the WARN region.

Here, the WARN region width is defined based on what percentage [%] of the number of all verified paths is employed as the number of paths included in the WARN region around a threshold. The threshold is the value of the item at the boundary between x and ○, for example. The threshold is defined by the developer of the machine learning DB 303, for example. The WARN region varies due to new plotting of design information in some cases.

FIG. 6 is an explanatory diagram illustrating a variation example of a WARN region. The graph 500 on the upper side in FIG. 6 represents a plotting result before addition of new design information. The graph 500 on the lower side in FIG. 6 represents a plotting result resulting from the addition of the new design information. ○ of a dotted line and x of a dotted line are the added plotting.

Here, the WARN region is defined as a region in which paths of a given percentage of all paths are included. The given percentage is set to 10 [%], for example, and the WARN region is defined as a region in which paths of 10[%] of the whole are included, for example. In the upper-side graph 500, when the number of verified paths is 50 samples, the number of paths corresponding to the WARN region is 50/10, five samples. In the lower-side graph 500, 10 samples of design information are newly plotted. In the lower-side graph 500, the number of verified paths is 60 samples and the number of paths corresponding to the WARN region is 60/10, six samples. The width of the WARN region illustrated in the lower-side graph 500 becomes a region width that encompasses the six samples. Therefore, the region width of the WARN region illustrated in the lower-side graph 500 becomes smaller than the region width of the WARN region illustrated in the upper-side graph 500. The OK region and the NG region expand in association with the reduction in the region width and thus improvement in the accuracy of determination of the cause of the error may be intended.

For example, in the upper-side graph 500, if the number of logic stages of a path on which a timing error has occurred is "10" stages, the path corresponds to the WARN region. Thus, it is difficult for the information processing device 100 to uniquely determine whether or not the timing error has occurred because of the "10" stages as the number of logic stages of the path. On the other hand, in the lower-side graph 500, if the number of logic stages of a path on which a timing error has occurred is "10" stages, the path corresponds to the OK region. Thus, the information processing device 100 may determine that a timing error has not occurred because of the "10" stages as the number of logic stages. Furthermore, the machine learning DB 303 may be created regarding each of manufacturers of the provision source of the FPGA, the kinds of FPGA, and operating frequencies although diagrammatic representation is omitted.

(Stored Contents of Various Kinds of DB and so Forth)

Next, the stored contents of various kinds of DB and so forth possessed by the information processing device 100 will be described. The various kinds of DB and so forth are implemented by storing units such as the ROM 402 and the disc 405 of the information processing device 100 illustrated in FIG. 4 and a non-volatile semiconductor memory (diagrammatic representation is omitted).

FIG. 7 is an explanatory diagram illustrating a storing example of a machine learning DB. For example, the machine learning DB 303 is information in which the maximum value or the minimum value or the like in each of plural regions is associated with characteristic information on the manufacturer, the device, the frequency, and so forth regarding each of causes of the timing error.

The machine learning DB 303 has fields of the manufacturer, the device, the frequency, and main causes of the timing error. Information set in the fields of the manufacturer, the device, and the frequency is characteristic information relating to specifications of the target circuit of design.

In the field of the manufacturer, a company name is set as identification information of the manufacturer of the target FPGA. In the field of the device, a device name is set as identification information of the target FPGA. In the field of the frequency, the maximum frequency at which the target FPGA is operated is set.

The field of main causes of the timing error has fields of the number of logic stages, the inter-disposition distance, the number of fan-outs, the clock skew, and the interconnect length.

Each of the fields of the number of logic stages, the inter-disposition distance, the number of fan-outs, the clock skew, and the interconnect length has fields of Value and determination. In the field of Value, the value of the cause corresponding to the region is set regarding each region. In the field of determination, region information that represents the region is set. The region information is identification information of the region, such as a region name.

For example, in the case of the field of the number of logic stages, ranges of the number of logic stages are set in the field of Value. Furthermore, for example, in the field of determination, the identification information of the regions to which the ranges of the number of logic stages set in the field of Value correspond is set. According to the machine learning DB 303, the information processing device 100 determines that the number of logic stages corresponds to the OK region if the number of logic stages is equal to or larger than 0 and is equal to or smaller than 20, for example.

FIG. 8 is an explanatory diagram illustrating a storing example of a countermeasure DB. The countermeasure DB 304 has the contents of output of countermeasures according to the determination result regarding each of main causes of the timing error, for example. The countermeasure DB 304 has fields of main causes of the timing error, the determination value, and the contents of countermeasures, for example.

In the field of main causes of the timing error, the name of the cause is set as identification information of main causes of the timing error. In the field of the determination value, the determination result is set. In the field of the determination value, "WARN" or "NG" is set. In the field of the contents of countermeasures, the contents of countermeasures corresponding to the determination result are set regarding each cause. For example, if determining that the number of logic stages of a path in the target circuit represented by a new netlist corresponds to the WARN region in the timing verification result, the information processing device 100 acquires the contents of a countermeasure from the countermeasure DB 304 and outputs the contents of the countermeasure as a report.

FIG. 9 is an explanatory diagram illustrating a report example relating to a timing error. A report 302-*x* is a report that is obtained by timing verification and relates to a timing error, for example.

The report 302-x is information relating to a timing error of a path between register A and register B, for example. "Source" represents the register on the transmitting side of the path. In the example of FIG. 9, register A is the register on the transmitting side. The register on the transmitting side is abbreviated to be referred to also as the transmitting register. "Sink" represents the register on the receiving side of the path. The register on the receiving side is abbreviated to be referred to also as the receiving register. In the example of FIG. 9, register B is the register on the receiving side.

"Data Arrival Time" is the time until data arrives at the receiving register from the transmitting edge of a common clock source through the transmitting register, for example. "Data Required Time" is the time to be satisfied.

The value obtained by subtracting "Data Arrival Time" from "Data Required Time" is "Slack." If "Slack" is a negative value, a timing error has occurred on the path. If "Slack" is a positive value, a timing error has not occurred on the path. In the example of FIG. 9, "Slack" is "−2" and therefore it is determined that a timing error has occurred on the path.

Furthermore, in "Data Arrival Path" and "Total Arrival Path," detailed delay of the data signal of the path is described.

"Total" is the total delay time. "Incr" is the delay time of an element on the path. "Type" is the kind of delay. If "Type" is "CELL," the delay is gate delay. If "Type" is "IC (Inter Connect)," the delay is interconnect delay. "Fanout" is the number of fanouts of the element on the path. "Element" is the element that causes the delay on the path.

According to the report 302-x, cell A and cell B exist on the data path between register A and register B. Each of the gate delay time of cell A, cell B, and register B is 1 [ns]. The interconnect delay time is 7 [ns]. Thus, the total delay time is 10 [ns] whereas the interconnect delay time is 7 [ns]. Therefore, it is inferred that the timing error has occurred because the interconnect route is bad in this path.

(Functional Configuration Example of Information Processing Device 100)

Figure 10:
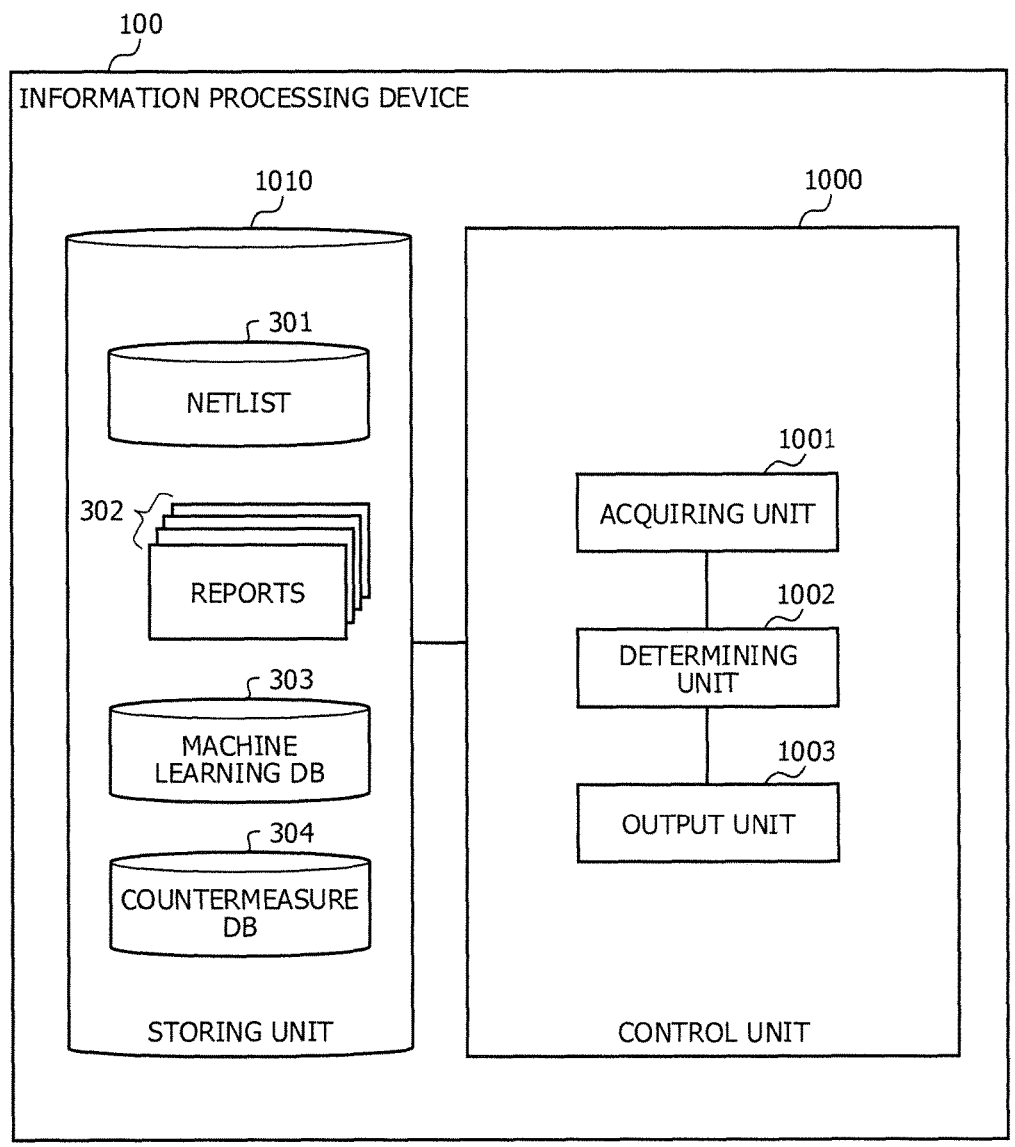
FIG. 10 is a block diagram illustrating a functional configuration example of an information processing device.

FIG. 10 is a block diagram illustrating a functional configuration example of an information processing device. The information processing device 100 includes a control unit 1000 and a storing unit 1010. The control unit 1000 includes an acquiring unit 1001, a determining unit 1002, and an output unit 1003. Processing of the control unit 1000 is coded into a program stored in a storing device such as the ROM 402, the RAM 403, or the disc 405 accessible by the CPU 401 illustrated in FIG. 4. Furthermore, the CPU 401 reads out this program from the storing device and executes the processing coded into the program. Thereby, the processing of the control unit 1000 is implemented. Moreover, the processing result of the control unit 1000 is stored in the storing device such as the ROM 402, the RAM 403, the disc 405, or a semiconductor memory (diagrammatic representation is omitted).

The storing unit 1010 includes the netlist 301, various kinds of reports 302, the machine learning DB 303, and the countermeasure DB 304, for example. The storing unit 1010 is implemented by the storing device such as the ROM 402, the RAM 403, the disc 405, or the semiconductor memory (diagrammatic representation is omitted).

First, description will be made by taking as an example the case in which the kind of item relating to delay of the path is one kind.

The acquiring unit 1001 acquires the value of the item relating to delay of the path included in the target circuit of verification. For example, the acquiring unit 1001 may acquire the value of the item by extracting the value of the item from the netlist 301 or the various kinds of reports 302. Furthermore, the acquiring unit 1001 may acquire the value of the item by accepting the value of the item input through operation by a user to input devices such as the keyboard 407 and the mouse 408.

Moreover, the acquiring unit 1001 decides any path of paths determined to involve a timing error as represented in the report 302-x among the paths included in the target circuit as the path of the processing target sequentially. Then, the acquiring unit 1001 acquires the value of the item about the decided path of the processing target. This allows the information processing device 100 to determine the cause of the timing error regarding each of the paths determined to involve the timing error in turn. Here, description will be made by taking as an example the case in which the item is the number of logic stages and the value of the item acquired regarding the path of the processing target is "23."

Next, the determining unit 1002 refers to the machine learning DB 303 and determines whether or not the region corresponding to the value of the item acquired by the acquiring unit 1001 among plural regions is a certain region. The plural regions include at least the above-described OK region and NG region, for example. In the present embodiment, the plural regions include three regions of the OK region, the WARN region, and the NG region, for example. If the plural regions include three regions, the certain region is one or two regions in decreasing order of level of possibility that timing constraints are not met among the plural regions, for example. The level of possibility that timing constraints are not met is in order of NG region, WARN region, and OK region. If two regions in decreasing order of level of possibility that timing constraints are not met are employed as the certain regions, the certain regions are two regions of the WARN region and the NG region. For example, the determining unit 1002 identifies the region corresponding to the value of the item acquired by the acquiring unit 1001 among the plural regions. Then, the determining unit 1002 determines whether or not the identified region is the certain region.

If the above-described number of logic stages is "23," the determining unit 1002 identifies the WARN region corresponding to "23." Then, the determining unit 1002 determines that the identified region is the certain region.

Next, if it is determined that the identified region is the certain region, the output unit 1003 refers to the countermeasure DB 304 and outputs the countermeasure information associated with the region information that represents the certain region. For example, the output unit 1003 acquires the contents of the countermeasure corresponding to the region information that represents the certain region about the item from the countermeasure DB 304 and outputs a report including the contents of the countermeasure. The output unit 1003 may display the countermeasure information on the display 409 or the like. Alternatively, the output unit 1003 may store the countermeasure information in the storing unit 1010 or the like in association with the path and the item.

If the above-described number of logic stages is "23," the output unit 1003 acquires, from the countermeasure DB 304, the contents of the countermeasure of the case in which the field of main causes of the timing error is "the number of logic stages" and the field of the determination value is "WARN." Then, the output unit 1003 generates and outputs the report 310-1 based on the acquired contents of the countermeasure.

Next, description will be made by taking as an example the case in which the kind of item relating to delay of the path is plural kinds.

The acquiring unit 1001 acquires the value of the item relating to delay of the path included in the target circuit of verification regarding each of plural items. The acquisition method is the same as the case in which the kind of item is one kind and therefore detailed description thereof is omitted.

Next, regarding each of the plural items, the determining unit 1002 refers to the machine learning DB 303 and determines whether or not the region corresponding to the value of the item acquired by the acquiring unit 1001 among the plural regions is the certain region.

Then, regarding each of the plural items, if it is determined that the region corresponding to the value of the item is the certain region, the output unit 1003 refers to the countermeasure DB 304 and outputs the countermeasure information associated with the region information that represents the certain region. As the output format, output to the display 409, output to an external device through the network 410, and output to a storing device such as the ROM 402 or the RAM 403 are cited. For example, the output unit 1003 acquires, from the countermeasure DB 304, the contents of the countermeasure corresponding to the region information that represents the certain region regarding the item determined to correspond to the certain region. Subsequently, the output unit 1003 generates a report including the acquired contents of the countermeasure, for example. Then, the output unit 1003 outputs the generated report, for example.

Furthermore, the output unit 1003 may output the contents of the countermeasure on each path basis based on the generated report, for example. It is to be noted that an example in which the contents of the countermeasure are output to the display 409 on each path basis will be described by using FIG. 11 to be described later.

Moreover, the output unit 1003 may output the contents of the countermeasure and the path regarding each of the items or regarding each of the items and the regions based on the generated report, for example.

Furthermore, priority may be defined for each of the plural items. The output unit 1003 may output the contents of the countermeasure and the path regarding the items sequentially in decreasing order of priority based on the generated report. It is to be noted that an example in which the contents of the countermeasure and the path are output to the display 409 regarding the items sequentially in decreasing order of priority will be described by using FIG. 12 to be described later.

Here, certain items are items up to an N-th item (N is a given number) in decreasing order of priority from the item with the highest priority among the plural items. For example, the priority of an item whose value may be identified by an upstream process in the design process of the target circuit is set higher. The priority of an item whose value may be identified by a downstream process in the design process of the target circuit is set lower. For example, the number of logic stages is identified based on the netlist 301 after logic synthesis of an RTL netlist. For example, the number of logic stages is an item that may be identified without carrying out layout design. On the other hand, the priority is set lower regarding items whose value is identified by carrying out layout design, such as the inter-disposition distance, the number of fan-outs, the clock skew, and the interconnect length. Here, the priority of the number of logic stages is set higher than the priority of the inter-disposition distance, the number of fan-outs, the clock skew, and the interconnect length. Furthermore, the priority is set identical among the inter-disposition distance, the number of fan-outs, the clock skew, and the interconnect length.

For example, if determining that the region corresponding to the value of the item regarding the item included in the items up to the N-th item (N is the given number) in decreasing order of priority among the plural items is the WARN region or the NG region, the determining unit 1002 does not execute determination processing regarding the items other than this item included in the items up to the N-th item. The determination processing here is processing of determining whether or not the region to which the value of the above-described item corresponds is the certain region. For example, if determining that the region corresponding to the value about the number of logic stages is the WARN region or the NG region, the determining unit 1002 does not execute the determination processing regarding the items other than the number of logic stages. Furthermore, for example, if determining that the region corresponding to the value about the number of logic stages is not the WARN region or the NG region, the determining unit 1002 executes the determination processing regarding the items other than the number of logic stages.

Figure 11:
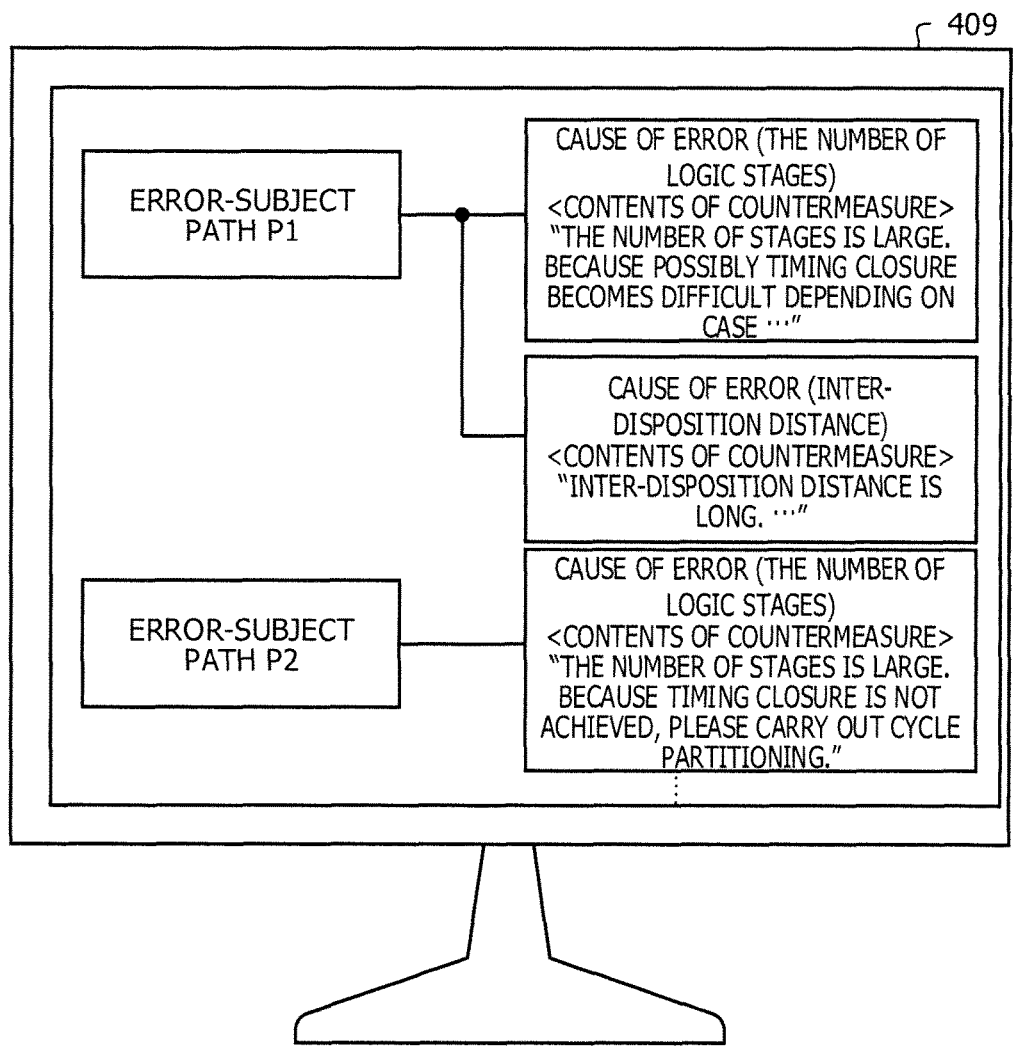
FIG. 11 is an explanatory diagram illustrating a screen output example.

FIG. 11 is an explanatory diagram illustrating a screen output example. As described above, the output unit 1003 outputs the contents of the countermeasure to the display 409 on each path basis based on reports including the respective contents of the countermeasures, for example. In the example of FIG. 11, the output unit 1003 outputs the contents of the countermeasure of the number of logic stages and the contents of the countermeasure of the inter-disposition distance in association with a path P1. The number of logic stages and the inter-disposition distance are items regarding which it is determined that the region corresponding to the value about the path P1 corresponds to the WARN region or the NG region. This allows the information processing device 100 to intend to facilitate identification of the cause of the error on each path basis.

Figure 12:
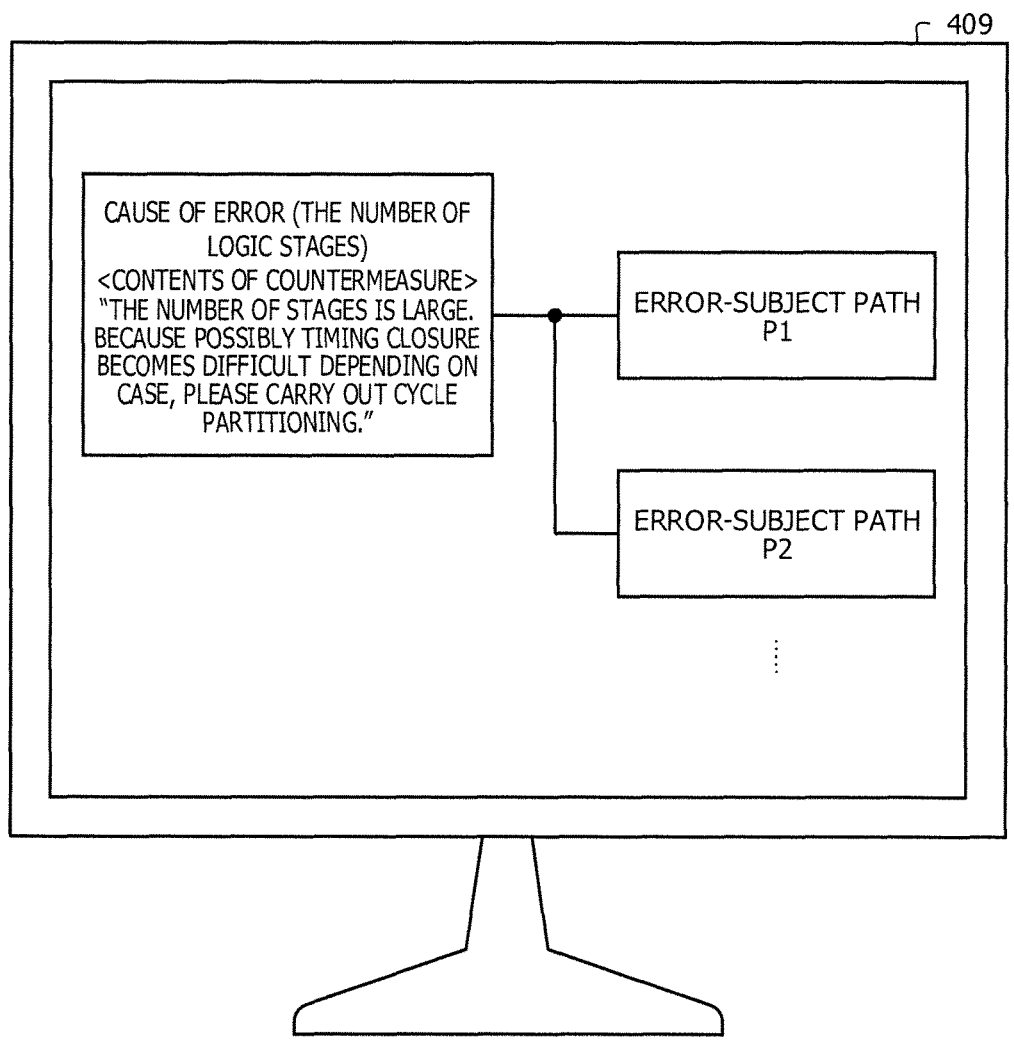
FIG. 12 is an explanatory diagram illustrating another screen output example.

FIG. 12 is an explanatory diagram illustrating another screen output example. As described above, the output unit 1003 outputs paths in association with an item and the contents of the countermeasure of a region, for example. In the example of FIG. 12, paths regarding which the cause of the error is that the number of logic stages is large are the path P1 and a path P2. The output unit 1003 outputs the contents of the countermeasure about the number of logic stages and the paths regarding which the cause of the error is that the number of logic stages is large while associating the contents of the countermeasure with the paths. This allows the information processing device 100 to support resolution of the timing error.

(Processing Procedure Example Carried Out by Information Processing Device 100)

Figure 13:
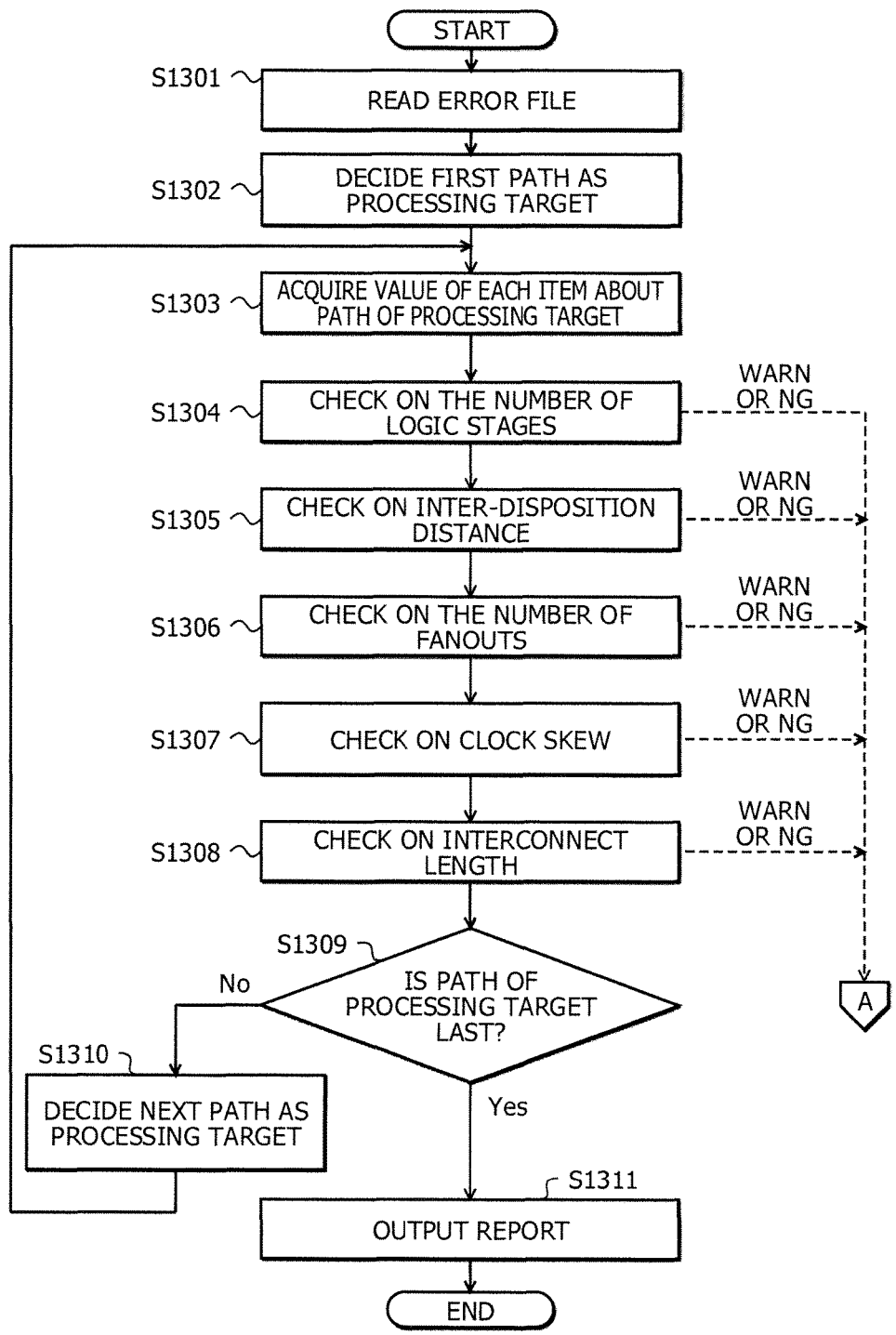
FIG. 13 is a flowchart illustrating a processing procedure example carried out by an information processing device.

FIG. 13 is a flowchart illustrating a processing procedure example carried out by an information processing device. The information processing device 100 reads an error file from the reports 302 (step S1301). The error file is the report 302-*x* or the like, for example. Next, the information processing device 100 decides the first path as the processing target (step S1302). The first path is the path that is described at the beginning of the error file and has been determined to involve a timing error. Then, the information processing device 100 acquires the value of each item about the path of the processing target from the error file (step S1303).

Next, the information processing device 100 makes a check on the number of logic stages (step S1304) and makes transition to a step S1305. Making the check in the step S1304 is that the information processing device 100 determines whether or not the region corresponding to the number of logic stages acquired regarding the path of the processing target is the WARN region or the NG region with reference to the machine learning DB 303. If it is determined that the region corresponding to the number of logic stages is the WARN region or the NG region, the information processing device 100 makes transition to processing represented in FIG. 14 besides the step S1305. As above, if it is determined that the region corresponding to the number of logic stages is the WARN region or the NG region, the information processing device 100 activates the processing represented in FIG. 14 as a thread and executes the processing. Thus, if it is determined that the region corresponding to the number of logic stages is the WARN region or the NG region, the information processing device 100 makes transition to both the processing represented in FIG. 14 and the step S1305.

The information processing device 100 makes a check on the inter-disposition distance (step S1305) and makes transition to a step S1306. Making the check on the inter-disposition distance in the step S1305 is that the information processing device 100 determines whether or not the region corresponding to the inter-disposition distance acquired regarding the path of the processing target is the WARN region or the NG region. If it is determined that the region corresponding to the inter-disposition distance is the WARN region or the NG region, the information processing device 100 makes transition to the step S1306 and the processing represented in FIG. 14 similarly to the step S1304. In this manner, every time it is determined that the region corresponding to the value of the item is the WARN region or the NG region, the information processing device 100 activates the processing represented in FIG. 14 as a thread.

The information processing device 100 makes a check on the number of fan-outs (step S1306) and makes transition to a step S1307. Making the check on the number of fan-outs in the step S1306 is that the information processing device 100 determines whether or not the region corresponding to the number of fan-outs acquired regarding the path of the processing target is the WARN region or the NG region. If it is determined that the region corresponding to the number of fan-outs is the WARN region or the NG region, the information processing device 100 makes transition also to the processing represented in FIG. 14 similarly to the step S1304 and the step S1305.

Furthermore, the information processing device 100 makes a check on the clock skew (step S1307) and makes transition to a step S1308. Making the check on the clock skew in the step S1307 is that the information processing device 100 determines whether or not the region corresponding to the clock skew acquired regarding the path of the processing target is the WARN region or the NG region. If it is determined that the region corresponding to the clock skew is the WARN region or the NG region, the information processing device 100 makes transition to the step S1308 and the processing represented in FIG. 14 similarly to the steps S1304 to S1306.

Next, the information processing device 100 makes a check on the interconnect length (step S1308) and makes transition to a step S1309. Making the check on the interconnect length in the step S1308 is that the information processing device 100 determines whether or not the region corresponding to the interconnect length acquired regarding the path of the processing target is the WARN region or the NG region. If it is determined that the region corresponding to the interconnect length is the WARN region or the NG region, the information processing device 100 makes transition also to the processing represented in FIG. 14 similarly to the steps S1304 to S1307.

Next, the information processing device 100 determines whether or not the path of the processing target is the last path (step S1309). Determining whether or not the path of the processing target is the last path in the step S1309 represents determining whether or not a path other than the path of the processing target among the paths determined to involve a timing error has already become the processing target.

Then, if it is determined that the path of the processing target is not the last path (step S1309: No), the information processing device 100 decides the next path as the processing target (step S1310) and returns to the step S1303. The next path represents any path of paths that have not become the processing target among the paths that are described in the error file and have been determined to involve a timing error. The information processing device 100 may select the paths determined to involve a timing error in turn as the processing target due to the step S1302, the step S1309, and the step S1310. If it is determined that the path of the processing target is the last path (step S1309: Yes), the information processing device 100 outputs a generated report (step S1311). The report is generated by the thread to execute the processing represented in FIG. 14. Furthermore, the information processing device 100 carries out the step S1311 after the processing represented in FIG. 14 ends.

Figure 14:
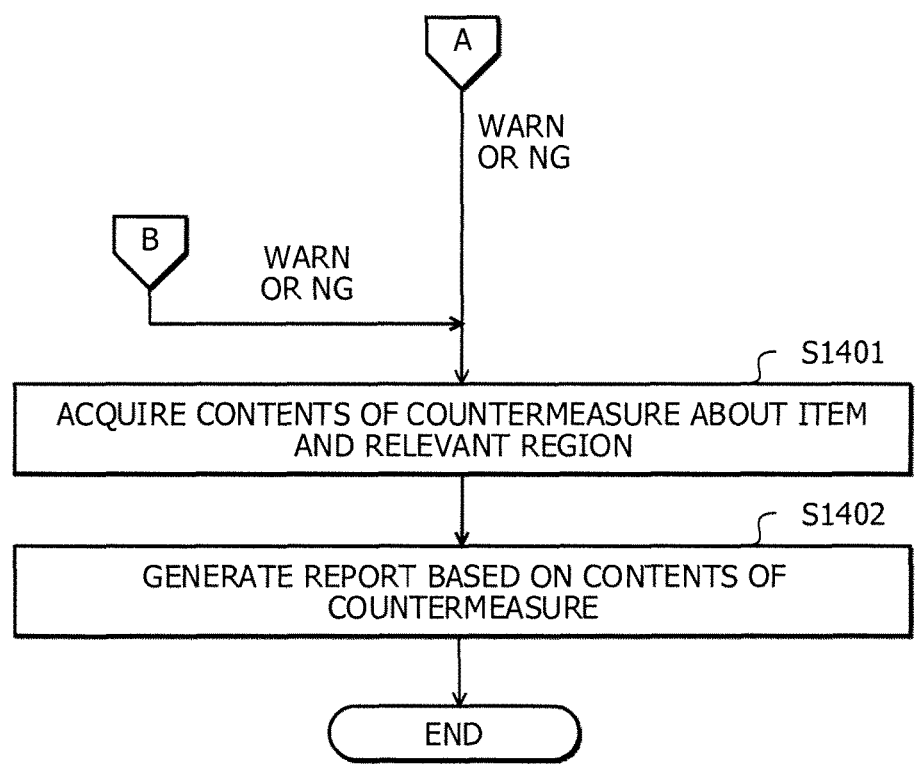
FIG. 14 is a flowchart illustrating a procedure example of report generation processing executed by an information processing device.

FIG. 14 is a flowchart illustrating a procedure example of report generation processing executed by an information processing device. If it is determined that the region corresponding to the value of the item is the WARN region or the NG region in FIG. 13 or FIG. 15 to be described later, the information processing device 100 generates the thread to execute the generation processing of a report while employing the kind of item and the region information as an input. The respective steps represented in FIG. 14 are the contents of processing of the generated thread.

First, the information processing device 100 refers to the countermeasure DB 304 and acquires the contents of the countermeasure about the item and the relevant region (step S1401). Next, the information processing device 100 generates a report based on the contents of the countermeasure (step S1402) and ends the series of processing.

Figure 15:
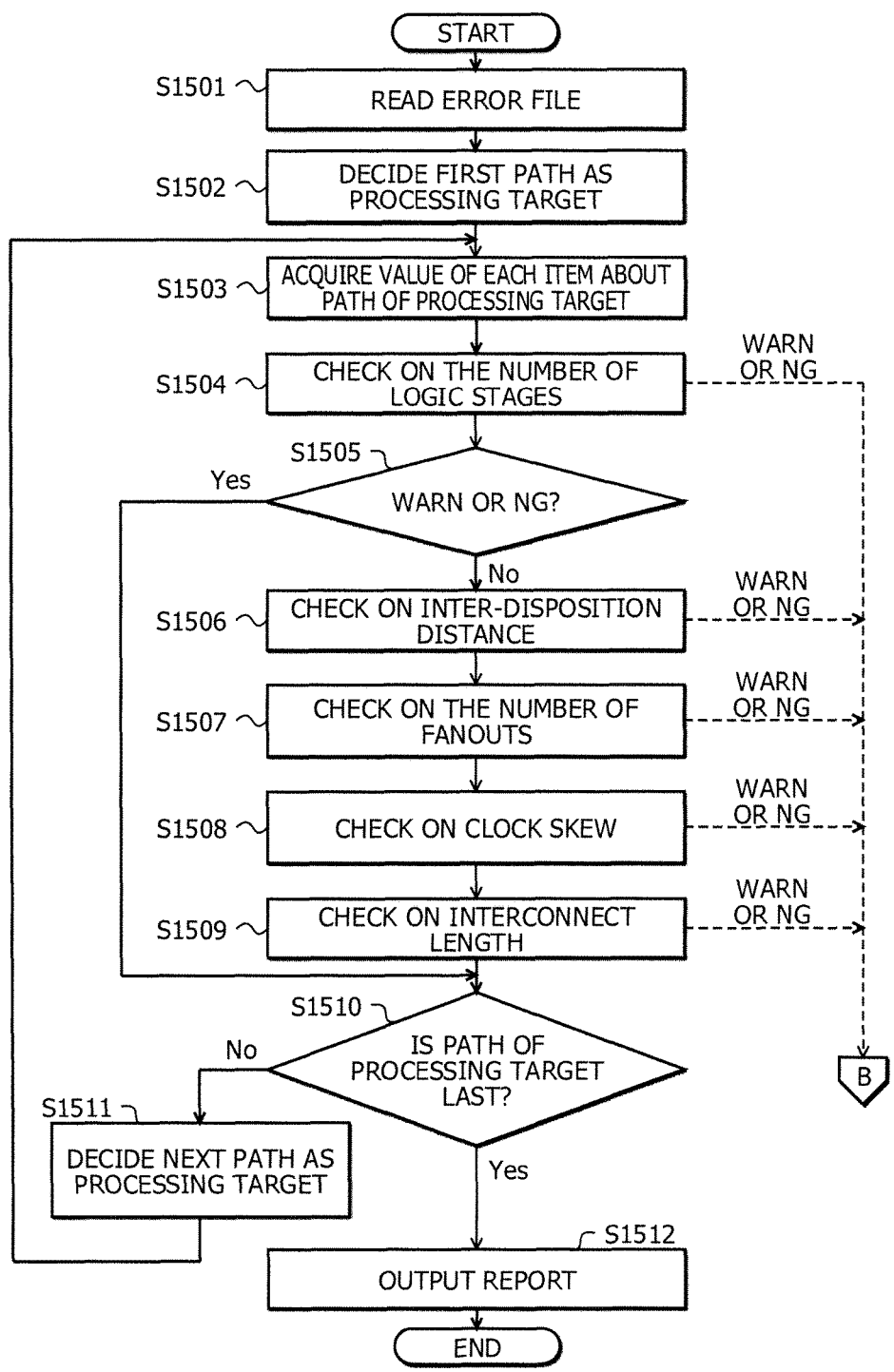
FIG. 15 is a flowchart illustrating another processing procedure example carried out by an information processing device.

FIG. 15 is a flowchart illustrating another processing procedure example carried out by an information processing device. The information processing device 100 reads an error file from the reports 302 (step S1501). The error file is the report 302-x or the like, for example. Next, the information processing device 100 decides the first path as the processing target (step S1502). The first path is the path that is described at the beginning of the error file and has been determined to involve a timing error. Then, the information processing device 100 acquires the value of each item about the path of the processing target (step S1503).

Next, the information processing device 100 makes a check on the number of logic stages (step S1504) and makes transition to a step S1505. Making the check in the step S1504 is that the information processing device 100 determines whether or not the region corresponding to the number of logic stages acquired regarding the path of the processing target is the WARN region or the NG region. If it is determined that the region corresponding to the number of logic stages is the WARN region or the NG region, the information processing device 100 makes transition also to the processing of FIG. 14. As above, if it is determined that the region corresponding to the number of logic stages is the WARN region or the NG region, the information processing device 100 activates the processing represented in FIG. 14 as a thread and executes the processing. Thus, if it is determined that the region corresponding to the number of logic stages is the WARN region or the NG region, the information processing device 100 makes transition to both the processing represented in FIG. 14 and the step S1505.

Next, the information processing device 100 determines whether or not the region corresponding to the number of logic stages is the WARN region or the NG region (step S1505). If it is determined that the region corresponding to the number of logic stages is the WARN region or the NG region (step S1505: Yes), the information processing device 100 makes transition to a step S1510. If it is determined that the region corresponding to the number of logic stages is not the WARN region or the NG region (step S1505: No), the information processing device 100 makes transition to a step S1506.

The information processing device 100 makes a check on the inter-disposition distance (step S1506) and makes transition to a step S1507. Making the check on the inter-disposition distance in the step S1506 is that the information processing device 100 determines whether or not the region corresponding to the inter-disposition distance acquired regarding the path of the processing target is the WARN region or the NG region. If it is determined that the region corresponding to the inter-disposition distance is the WARN region or the NG region, the information processing device 100 makes transition also to the processing of FIG. 14 similarly to the step S1504. In this manner, every time it is determined that the region corresponding to the value of the item is the WARN region or the NG region, the information processing device 100 activates the processing represented in FIG. 14 as a thread.

The information processing device 100 makes a check on the number of fan-outs (step S1507) and makes transition to a step S1508. Making the check on the number of fan-outs in the step S1507 is that the information processing device 100 determines whether or not the region corresponding to the number of fan-outs acquired regarding the path of the processing target is the WARN region or the NG region. If it is determined that the region corresponding to the number of fan-outs is the WARN region or the NG region, the information processing device 100 makes transition also to the processing represented in FIG. 14 similarly to the step S1504 and the step S1506.

Furthermore, the information processing device 100 makes a check on the clock skew (step S1508) and makes transition to a step S1509. Making the check on the clock skew in the step S1508 is that the information processing device 100 determines whether or not the region corresponding to the clock skew acquired regarding the path of the processing target is the WARN region or the NG region. If it is determined that the region corresponding to the clock skew is the WARN region or the NG region, the information processing device 100 makes transition also to the processing represented in FIG. 14 besides the step S1509 similarly to the step S1504, the step S1506, and the step S1507.

Next, the information processing device 100 makes a check on the interconnect length (step S1509) and makes transition to a step S1510. Making the check on the interconnect length in the step S1509 is that the information processing device 100 determines whether or not the region corresponding to the interconnect length acquired regarding the path of the processing target is the WARN region or the NG region. If it is determined that the region corresponding to the interconnect length is the WARN region or the NG region, the information processing device 100 makes transition also to the processing represented in FIG. 14 besides the step S1510 similarly to the step S1504 and the steps S1506 to S1508.

Next, the information processing device 100 determines whether or not the path of the processing target is the last path (step S1510). Determining whether or not the path of the processing target is the last path in the step S1510 represents determining whether or not a path other than the path of the processing target among the paths determined to involve a timing error has already become the processing target.

Then, if it is determined that the path of the processing target is not the last path (step S1510: No), the information processing device 100 decides the next path as the processing target (step S1511) and returns to the step S1503. The next path represents any path of paths that have not become the processing target among the paths that are described in the error file and have been determined to involve a timing error. The information processing device 100 may select the paths determined to involve a timing error in turn as the processing target due to the step S1502, the step S1510, and the step S1511. If it is determined that the path of the processing target is the last path (step S1510: Yes), the information processing device 100 outputs a generated report (step S1512). The report is generated by the thread to execute the processing represented in FIG. 14. Furthermore, the information processing device 100 carries out the step S1512 after the processing represented in FIG. 14 ends.

Furthermore, in the present embodiment, the path determined to involve a timing error is cited as an example of the path of the processing target. However, the path of the processing target is not limited thereto. For example, the information processing device 100 may deem a path specified by the verifier or the like as the path of the processing target. For example, the information processing device 100 may be used to discriminate a path having a high possibility of the occurrence of a timing error before timing verification is carried out.

Moreover, in the present embodiment, the example in which the machine learning DB 303 is created by operation by the creator is cited. However, the configuration is not limited thereto. For example, the information processing device 100 may generate the machine learning DB 303 by employing the value of the item and the slack value as input information regarding each item.

As described above, the information processing device 100 outputs a countermeasure plan for timing error resolution if the value of the item relating to delay of the path of the target circuit corresponds to the NG region or the WARN region among the regions delimited based on the level of possibility of the timing error. This may intend improvement in the efficiency of identification of the cause of the timing error. For example, intending improvement in the efficiency of identification of the cause of the timing error represents intending shortening of the time it takes to identify the causes of the timing error without depending on the level of proficiency of the verifier. For example, in some cases, even if it takes several months to identify the causes of timing errors by operation by a verifier, it becomes possible to identify the causes in several days according to the present embodiment.

Furthermore, the plural regions are regions delimited based on the slack value of paths and the value of an item of the paths. This allows the information processing device 100 to use the regions delimited based on past design information and thus may intend to improve the accuracy of determination of whether or not the value of the item is the cause of a timing error on each item basis.

Moreover, the plural regions are three regions of the OK region, the NG region, and the WARN region and the WARN region is a region into which paths of a given percentage among plural paths whose slack value has been calculated are classified based on the value of the item. Due to this, when the number of plural paths becomes larger, the region range of the WARN region becomes smaller. Therefore, improvement in the determination accuracy may be intended.

Furthermore, if plural kinds of items exist, the information processing device 100 executes each kind of processing regarding each of the plural items. This allows the information processing device 100 to intend to facilitate verification about various causes of timing errors.

If determining that the region corresponding to the value of an item is the WARN region or the NG region regarding a certain item, the information processing device 100 does not execute processing of determining whether or not the region corresponding to the value of the item is the certain region and processing of outputting countermeasure information regarding the items other than the certain item. The certain item is an item whose value may be identified from a netlist after logic synthesis. The item whose value may be identified from a netlist is the number of logic stages, for example. For example, if a large number of logic stages is the cause of a timing error, there is a possibility that the designer corrects the netlist. For this reason, if a large number of logic stages is the cause of a timing error, items whose value is identified from layout data are not deemed as the target of processing, which may intend to shorten the time for verification.

Furthermore, the path of the processing target is a path determined to involve a timing error. Due to this, shortening of the analysis time may be intended by limiting the paths to the paths that have been determined to involve a timing error.

It is to be noted that the verification support method described in the present embodiment may be implemented by executing a verification support program prepared in advance by a computer such as a personal computer or a work station. This verification support program is recorded in a computer-readable recording medium such as a magnetic disc, an optical disc, or a universal serial bus (USB) flash memory and is executed by being read out from the recording medium by the computer. Furthermore, the verification support program may be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable medium storing a verification support program that causes a processor, coupled to a memory storing:
    first correspondence information in which, regarding each region of a plurality of regions delimited based on a level of possibility that a path included in a circuit does not meet timing constraints, region information that represents the region and a range of a value of an item relating to delay of the path in the region are associated with each other, and
    second correspondence information in which, regarding a certain region among the plurality of regions, region information that represents the certain region and countermeasure information that represents a countermeasure against delay of the path whose value of the item corresponds to the certain region are associated with each other,
    to execute a process, the process including:
        acquiring a value of the item relating to delay of a path included in a target circuit of verification;
        determining whether or not a region corresponding to the acquired value of the item among the plurality of regions is the certain region with reference to the first correspondence information; and
        outputting the countermeasure information associated with the region information that represents the certain information with reference to the second correspondence information in response to determining that the region corresponding to the acquired value of the item is the certain region.

2. The non-transitory computer-readable medium according to claim 1, wherein
    the plurality of regions are delimited based on an index value relating to delay of the path regarding each path of a plurality of paths included in the circuit and the value of the item relating to delay of the path.

3. The non-transitory computer-readable medium according to claim 2, wherein
    the plurality of regions include a first region whose level of possibility that the timing constraints are not met is highest, a second region whose level of possibility that the timing constraints are not met is lowest, and a third region whose level of possibility that the timing constraints are not met is second highest, and
    when each path of the plurality of paths included in the circuit is classified into any region of the plurality of regions,
        the first region is a region into which paths determined not to meet the timing constraints based on the index value among the plurality of paths are classified based on the value of the item,
        the second region is a region into which paths determined to meet the timing constraints based on the index value among the plurality of paths are classified based on the value of the item, and
        the third region is a region into which paths of a given ratio among the plurality of paths are classified based on the value of the item.

4. The non-transitory computer-readable medium according to claim 1, wherein
    in the first correspondence information, regarding each item of a plurality of items relating to delay of the path, region information that represents the region regarding each region of the plurality of regions and a range of a value of the item in the region are associated with each other,
    in the second correspondence information, regarding each item of the plurality of items, region information that represents the certain region regarding the certain region and countermeasure information that represents a countermeasure against delay of the path whose value of the item corresponds to the certain region are associated with each other, and regarding each item of the plurality of items, the processor is caused to execute processing of the acquiring the value of the item, the processing of determining whether or not the region corresponding to the acquired value of the item is the certain region, and the processing of outputting the countermeasure information.

5. The non-transitory computer-readable medium according to claim 4, wherein when it is determined that the region corresponding to the acquired value of the item is the certain region regarding a given item among the plurality of items, the processor is kept from executing the processing of determining whether or not the region corresponding to the acquired value of the item is the certain region and the processing of outputting the countermeasure information regarding items other than the given item among the plurality of items.

6. The non-transitory computer-readable medium according to claim 5, wherein the given item is an item whose value is allowed to be identified from a netlist that represents cells included in the target circuit and a coupling relationship among the cells.

7. The non-transitory computer-readable medium according to claim 1, wherein the path included in the target circuit is a path determined not to meet the timing constraints in a result of timing verification.

8. A verification support method in which a processor, coupled to a memory storing:

first correspondence information in which, regarding each region of a plurality of regions delimited based on a level of possibility that a path included in a circuit does not meet timing constraints, region information that represents the region and a range of a value of an item relating to delay of the path in the region are associated with each other, and second correspondence information in which, regarding a certain region among the plurality of regions, region information that represents the certain region and countermeasure information that represents a countermeasure against delay of the path whose value of the item corresponds to the certain region are associated with each other, executes a process including:

acquiring a value of the item relating to delay of a path included in a target circuit of verification;

determining whether or not a region corresponding to the acquired value of the item among the plurality of regions is the certain region with reference to the first correspondence information; and outputting the countermeasure information associated with the region information that represents the certain information with reference to the second correspondence information in response to determining that the region corresponding to the acquired value of the item is the certain region.

9. An information processing apparatus comprising:

a memory configured to store first correspondence information in which, regarding each region of a plurality of regions delimited based on a level of possibility that a path included in a circuit does not meet timing constraints, region information that represents the region and a range of a value of an item relating to delay of the path in the region are associated with each other and second correspondence information in which, regarding a certain region among the plurality of regions, region information that represents the certain region and countermeasure information that represents a countermeasure against delay of the path whose value of the item corresponds to the certain region are associated with each other; and a processor coupled to the memory and configured to execute a process, the process including:

acquiring a value of the item relating to delay of a path included in a target circuit of verification, determining whether or not a region corresponding to the acquired value of the item among the plurality of regions is the certain region with reference to the first correspondence information, and outputting the countermeasure information associated with the region information that represents the certain information with reference to the second correspondence information in response to determining that the region corresponding to the acquired value of the item is the certain region.

* * * * *